United States Patent [19]

Lores et al.

[11] 3,770,423

[45] Nov. 6, 1973

[54] PROCESS FOR REMOVING DISSOLVED LEAD COMPOUNDS FROM AQUEOUS MEDIA

[75] Inventors: Carlos Lores, Hancocks Bridge, N.J.; Ralph Bishop Moore, New Castle, Del.

[73] Assignee: E. I. du Pont de Nemours and Company, Wilmington, Del.

[22] Filed: Feb. 4, 1972

[21] Appl. No.: 223,766

[52] U.S. Cl................... 75/108, 260/435, 210/50, 75/120
[51] Int. Cl................................................ C22b 3/00
[58] Field of Search............................ 75/108, 120; 260/435; 210/50

[56] References Cited
OTHER PUBLICATIONS

Finholt et al., "Journal of the American Chemical Society," Vol. 69, 1947, pp. 2692–2696.

Schaeffer, "Abstract of Papers, Division of Physical & Inorganic Chemistry, 127th Meeting ACS," Paper No. 57, p. 25Q, 1955.

Gaylord, "Reduction with Complex Metal Hydrides" Interscience Publ., Inc., N.Y. 1956, pp. 70–73.

Rosenzweig, "Chemical Engineering," Feb. 22, 1971, pp. 70–71.

*Primary Examiner*—Herbert T. Carter
*Attorney*—Louis H. Rombach

[57] ABSTRACT

Process for treating an aqueous medium containing dissolved organic and inorganic lead compounds, for example, aqueous effluent from the manufacture of tetraalkyl lead, with an alkali metal borohydride to substantially reduce the level of dissolved lead in the aqueous medium.

9 Claims, No Drawings

PROCESS FOR REMOVING DISSOLVED LEAD COMPOUNDS FROM AQUEOUS MEDIA

BACKGROUND OF THE INVENTION

1. Field of the Invention

This invention relates to a process for treating aqueous media which contain dissolved lead compounds, preferably at low levels.

2. Description of the Prior Art

Aqueous effluents from tetraalkyllead manufacturing processes usually contain dissolved organic and inorganic lead compounds. The dissolved organic lead content can amount to 100 to 100,000 ppm., the dissolved inorganic lead content, to as much as 4,000 ppm.

It is known that water soluble organic lead compounds can be formed from tetraalkyllead compounds under acidic or oxidizing conditions. For example, the aeration or oxygen purification of tetraalkyllead compounds in the presence of water leads to the formation of some soluble trialkyllead compounds. Moreover, the transalkylation of a mixture of tetraalkyllead compounds in contact with a Lewis acid to form tetra(mixed alkyl)lead compounds usually is accompanied by the formation of water soluble alkyllead compounds.

Disposal of the aqueous effluents may provide pollution problems because of their high lead contents and, in addition, may result in undesirable loss of lead.

Calingaert et al. in J. Am. Chem. Soc., 70, 3902 (1948) disclose the decomposition of hydroxides, halides and carbonates of trialkyllead compounds by steam distillation to form tetraalkyllead compounds, inorganic lead compounds and alkyl halides or hydrocarbons. The decompositions do not go to completion and are relatively slow, requiring 2 to 8 hours to achieve substantial decomposition.

U.S. Pat. No. 3,308,061 discloses the removal of soluble organolead compounds from aqueous effluents produced in the manufacture of alkyllead compounds by treating the effluents with ozone at a pH of 8.0 to 9.5. Such a treatment, using a high molar ozone to lead ratio, may be expensive and may preclude recovery of alkyllead from the effluent.

Processes for lowering the concentration of dissolved inorganic lead in aqueous effluents are known. Canadian Pat. No. 572,192 discloses the removal of inorganic lead as its carbonate at a pH of 8.0–9.5. Although this method can reduce inorganic lead to 2–4 ppm., it does not materially affect the level of lead present as alkyllead cations.

SUMMARY OF THE INVENTION

It is an object of this invention to provide a simple, economical and commercially practical process for treating aqueous effluents or media containing dissolved lead compounds, particularly organic lead compounds, so as to reduce the content of soluble lead therein to less than 2 ppm.

In summary, the present invention resides in a process whereby an aqueous medium containing 2–300 ppm. of lead in the form of soluble organolead compounds and up to 10 ppm. of lead in the form of soluble inorganic lead compounds is treated with an alkali metal borohydride to produce insoluble lead compounds and an aqueous medium containing less than 2 ppm. of lead in the form of soluble compounds.

DETAILED DESCRIPTION OF THE INVENTION

This invention is based on the discovery that alkali metal borohydrides are highly effective in very dilute aqueous media in lowering the concentration of dissolved lead compounds, particularly organic lead salts, in waste water or effluents from the manufacture of tetraalkyllead compounds. The invention is useful for minimizing natural water pollution by aqueous effluents resulting from such manufacture since by this process the level of dissolved lead can be reduced to less than 2 ppm., and if desired, to as low as 0.5 ppm.

More specifically, the present invention is directed to a process for treating an aqueous effluent from the manufacture of alkyllead compounds and containing 2–300 ppm., preferably 5–50 ppm., of lead in the form of soluble organolead compounds not precipitatable by pH adjustment and up to 10 ppm. of lead in the form of soluble inorganic lead compounds to procude a treated effluent having less than 2 ppm. of dissolved lead and insoluble lead-containing products.

To carry out this process, the aqueous effluent to be treated is intimately contacted with at least 10 percent, preferably 30–50 percent, of an alkali metal borohydride, based on the weight of dissolved lead. An excess of borohydride, as much as twenty times the minimum amount, can be used but such an excess is neither necessary nor economical. Contact can be effected by dissolving the borohydride directly in the effluent. Intimacy of contact can be facilitated by contacting the effluent with a prepared aqueous alkaline solution of the borohydride.

The insoluble lead-containing products which are formed include, as the chief products, hexaalkyldilead compounds derived from soluble alkyllead components and elemental lead derived from soluble inorganic lead components. Some of the hexaalkyldilead compounds, especially those with some methyl groups, may slowly decompose to produce other water insoluble lead-containing products such as tetraalkyllead compounds and additional elemental lead. These lead-containing products can be allowed to settle out or they can be filtered from the treated effluent.

The alkali metal borohydrides used in this process should be water soluble. Sodium, potassium and lithium borohydrides can be used but sodium borohydride is preferred. The borohydrides, especially at low borohydride to lead ratios, should be used under conditions which minimize hydrogen evolution. Hydrogen formation can be minimized by keeping the borohydrides in alkaline media before and during use. A typical, useful available borohydride is a stabilized solution containing 12 percent $NaBH_4$ in 40 percent aqueous NaOH.

Because of the normally low concentration of dissolved lead in the effluent to be treated, intimacy of contact of borohydride with dissolved lead is very important. Intimate contact can be assured by agitating the effluent containing added borohydride or by passing borohydride and effluent through a mixing tee.

The mixture of borohydride and aqueous effluent is maintained at a temperature and for a sufficient time to effect the lowering of the dissolved lead content of the effluent to the desired value. The process is carried out at a temperature which is above the freezing point of the effluent. Weather conditions may be a factor in the selection of operating conditions if the process is not operated in a temperature regulated building. Usually, the upper temperature limit is 50°C., preferably 40°C. The necessary borohydride contact time can range from a few minutes to about 48 hours depending on the borohydride:dissolved lead ratio, the initial dissolved lead level, the desired level of lead to be achieved, the intimacy of borohydride-effluent mixing and the temperature and pH during contact, but excess time is not detrimental to the process.

The process usually is carried out at a pH of 8–11. The use of a pH below 8 requires more borohydride to lower the dissolved lead content because hydrolysis of the borohydride (to form hydrogen gas) competes with the desired removal of lead compounds. At a pH above 11, the borohydride tends to be less reactive and more is needed for effective action. The preferred pH range of operation is 8.5–10 since at this pH the borohydride most efficiently lowers the dissolved lead level. In this pH range, the borohydride can lower the inorganic lead content below a level attainable by pH adjustment alone.

Precipitated lead-containing products can be separated from treated aqueous effluent by conventional methods, such as by settling, decantation, extraction with a water immiscible solvent for water insoluble organic liquids, filtration or combinations of these. Because of the low quantities involved, it is preferred to separate the lead-containing insoluble products by settling or by filtration. Where settling is used, treated effluent containing less than 2 ppm. of dissolved lead can be recovered by decantation, and settled lead-containing products remaining behind can be conveniently recovered at a later time. The setting of the water insoluble lead-containing products during the process can can be facilitated by incorporating into the effluent, preferably prior to the addition of borohydride, a small amount of flocculating agent which does not react with the alkali metal borohydride and which forms flocculent precipitates at a pH of 8–11. Such agents include salts of magnesium and aluminum and commercial organic flocculating agents. These agents are usually added in amounts about 0.3 to 0.5 times the weight of borohydride used to treat the effluent.

A preferred embodiment of this process comprises continuously injecting an aqueous solution of sodium borohydride into a flow of aqueous effluent, employing 0.3–0.5 part of sodium borohydride per part of dissolved lead in the stream. The pH of the mixture is maintained at 8.5–10 by adding, if necessary, an acid, such as hydrochloric or sulfuric acid, or a base, such as sodium hydroxide or sodium carbonate. The resulting mixture is held for at least 5 minutes, to allow for reaction, and then is filtered through a diatomaceous earth, commercially available as Kieselguhr or under such trade names as "Supercel," "Hydrocel," "Dicalite" and "Solkafloc." The insoluble organic and inorganic lead-containing products are effectively retained in a precoat of diatomaceous earth on the filter.

In another embodiment, the aforesaid resulting mixture, instead of being filtered, is continuously fed into a settling basin. Water insoluble lead-containing products are formed and drop down in the aqueous mass. At the basin end opposite the entry point of the mixture, supernatant water having a content of dissolved lead below 2 ppm. is withdrawn after a sufficient settling time, usually at least 3 hours. Water insoluble lead-containing products which have settled out during movement along the basin can be removed by means known in the art.

The process of the present invention is broadly applicable to the treatment of waste effluents produced in the manufacture of tetraalkyllead compounds, including methods based on the alkylation of sodium lead alloys, electrolytic methods of alkylating lead, and redistribution methods for producing mixed tetraalkyllead compounds.

This process is particularly applicable to the treatment of waste effluent from the manufacture of tetraethyllead by the reaction of sodium lead alloy with ethyl chloride; of tetramethyllead by the reaction of sodium lead alloy with methyl chloride in the presence of an aluminum halide; and of mixed methyl and ethyl alkyllead compounds by the redistribution of tetramethyllead and tetraethyllead mixtures with Lewis acid catalysts. All of these processes, together with the aeration purification process previously described, tend to produce in the aqueous effluent water soluble lead compounds not precipitatable by adjustment of pH to the alkaline range, for example, 8.5–10. Such compounds include those of the type $R_{4-n}PbX_n$ where R stands for methyl or ethyl, X for hydroxide or halide (such as chloride or fluoride) depending on the pH of the solution and n equals 1 or 2.

Ordinarily, the aqueous waste water to be treated will contain 2–300 ppm., usually 5–100 ppm., most often 5–50 ppm., of lead in the form of water soluble organic lead compounds not precipitatable by pH adjustment, and up to 10 ppm., depending on the pH of the waste water, of dissolved inorganic lead. Dissolved lead levels in the waste waters before treatment can be as high as 100,000 ppm., mostly as alkyllead salts; the levels usually are in the range of 10,000–50,000 ppm.

In the following examples, parts given are on a weight basis unless otherwise stated. Ppm. signifies parts per million of lead by weight based on the method described by S. R. Henderson and L. J. Snyder in Analytical Chemistry 33, 1172 (1961).

Example 1

Two samples of tetraalkyllead process aqueous effluent (settling basin water) containing 8.2 ppm. of total dissolved lead and having a pH of 9.0 were treated with sodium borohydride. To the first (A) was added 0.5 ppm. of $NaBH_4$ and to the second (B), 2.5 ppm. of $NaBH_4$. The samples were stirred for 16 hours at 20°C., filtered and analyzed for lead. Sample A showed 5.6 ppm. of lead and sample B, 0.4 ppm. of lead.

Example 2

Example 1 was repeated except that sample A contained 1.0 instead of 0.5 ppm. of $NaBH_4$ and samples of effluent were removed at intervals and analyzed for lead. The results are shown below.

| Stirring Time, Hours | Sample A | Sample B |
| --- | --- | --- |
| 0 | 8.2 | 8.2 |
| 1 | 5.8 | 5.2 |
| 2 | 5.1 | 4.6 |
| 4 | 3.2 | 2.6 |
| 16 | 2.4 | 0.45 |

Example 3

To each of four samples of the same settling basin water used for Example 1 were added 2.5 ppm. of $NaBH_4$. The pH of each sample was adjusted to the pH shown below with aqueous sodium hydroxide or hydrochloric acid as needed. The samples were stirred 6.5 hours at 20°C., filtered and analyzed for lead. The results are shown below.

| pH | ppm. of Lead |
|---|---|
| 6.7 | 6.4 |
| 9.3 | 0.65 |
| 11.2 | 3.4 |
| 12.0 | 4.1 |

Example 4

Four samples, A, B, C and D, of settling basin water obtained as in Example 1 but containing 6 ppm. of total dissolved lead were treated as follows:

A - Added 1 ppm. of a commercial flocculating agent ("Atlasep" 1A1), stirred 8 minutes and let settle for 16 hours.

B - Added 2 ppm. of $NaBH_4$, stirred 8 minutes, added 1 ppm. of the commercial flocculating agent, stirred 2 minutes and let settle for 16 hours.

C - Added 1 ppm. of the commercial flocculating agent, stirred 8 minutes, added 2 ppm. of $NaBH_4$, stirred 2 minutes and let settle for 16 hours.

D - Added 2 ppm. of $NaBH_4$, stirred 2 minutes and let settle for 16 hours.

At the end of the settling time, the supernatant liquid was decanted and analyzed for lead. The results are shown below.

| Sample | ppm. of Lead |
|---|---|
| A | 6 |
| B | 3.4 |
| C | 1.0 |
| D | 1.9 |

Example 5

A sample of aqueous effluent containing 5.75 ppm. of dissolved lead (about 90 percent in trialkyllead ions) and having a pH of 8.6 was stirred for 15 minutes at 20°C. in the presence of 2 ppm. of dissolved sodium borohydride and filtered within 5 minutes thereafter. The total lead concentration of the filtrate was 0.5 ppm.

The embodiments of the invention in which an exclusive property of privilege is claimed are defined as follows:

1. Process for treating aqueous medium containing 2-300 ppm. of lead in the form of soluble alkyllead compounds not precipitatable by pH adjustment and up to 10 ppm. of lead in the form of soluble inorganic lead compounds, which process comprises intimately contacting the medium, at an alkaline pH, and at least 10 percent, based on the weight of dissolved lead, of a borohydride of lithium, sodium or potassium to produce a water insoluble lead-containing product and a treated aqueous medium containing less than 2 ppm. of lead as dissolved lead compounds, and separating the water insoluble lead-containing product from the treated aqueous medium.

2. The process of claim 1 wherein the alkali metal borohydride is sodium borohydride.

3. The process of claim 1 wherein 30–50 percent alkali metal borohydride is employed.

4. The process of claim 1 wherein the pH of the effluent is adjusted to 8.5–10.

5. The process of claim 1 wherein a flocculating agent is employed along with the borohydride in an amount, by weight, 0.3–0.5 times the amount of borohydride.

6. The process of claim 1 wherein the aqueous medium is effluent from the manufacture of tetraalkyllead compounds, the effluent and borohydride are contacted in a continuous process wherein the pH is maintained at 8.5–10 and the treated effluent is continuously moved away from and decanted from the insoluble lead-containing product which settles out.

7. The process of claim 6 wherein a flocculating agent is employed along with the borohydride in an amount, by weight, 0.3–0.5 times the amount of borohydride.

8. The process of claim 1 wherein the treated aqueous medium is separated from the insoluble lead-containing product by decantation.

9. The process of claim 1 wherein the insoluble lead-containing product is separated from the treated aqueous medium by filtration.

* * * * *